Figure 23:
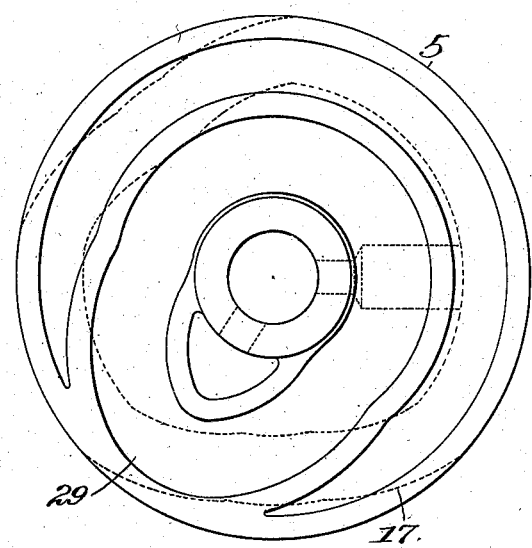

No. 885,244. PATENTED APR. 21, 1908.
J. B. HADAWAY.
MACHINE FOR OPERATING UPON WELTS OF BOOTS AND SHOES.
APPLICATION FILED MAY 26, 1902.
5 SHEETS—SHEET 1.
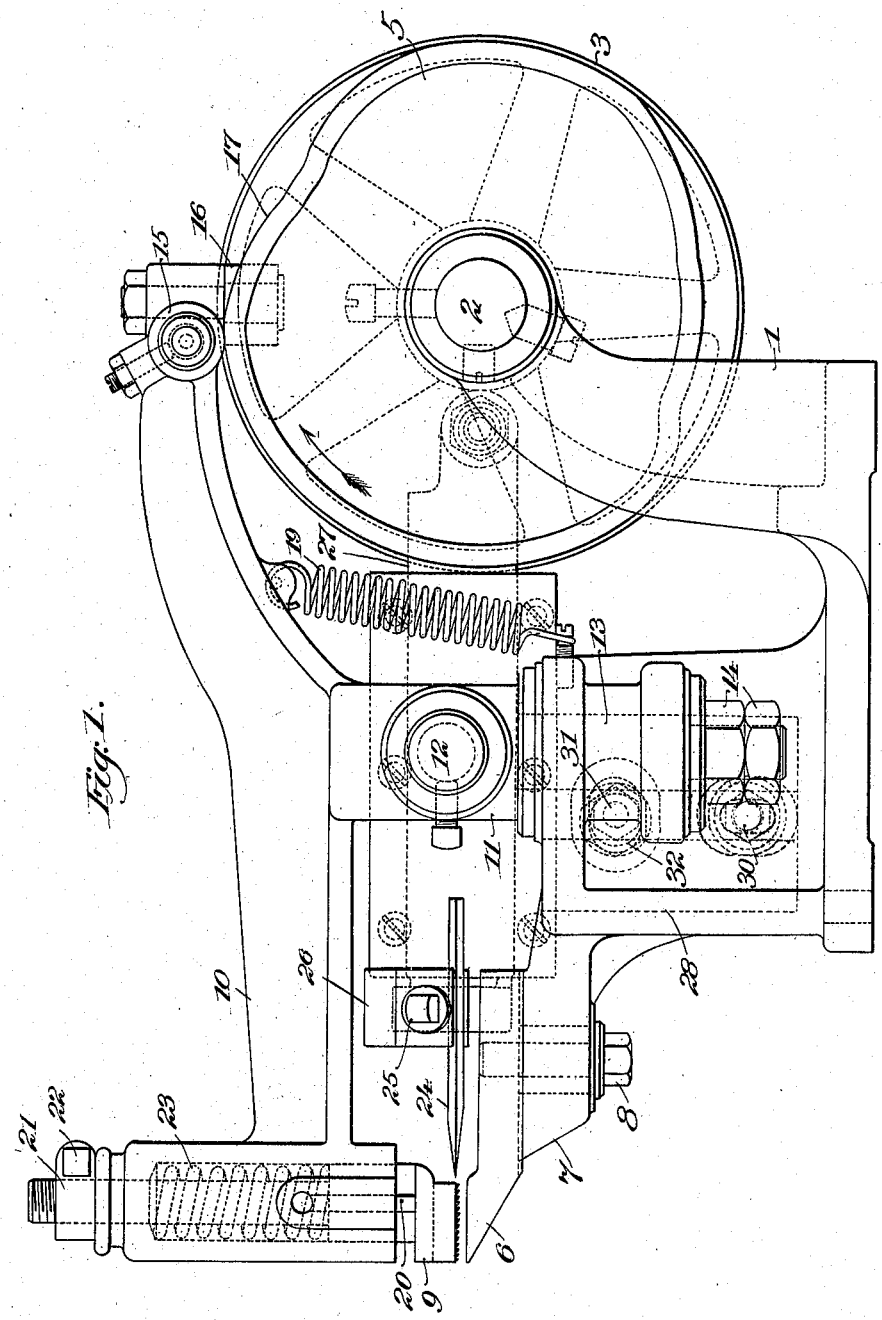

No. 885,244. PATENTED APR. 21, 1908.
J. B. HADAWAY.
MACHINE FOR OPERATING UPON WELTS OF BOOTS AND SHOES.
APPLICATION FILED MAY 26, 1902.
5 SHEETS—SHEET 2.
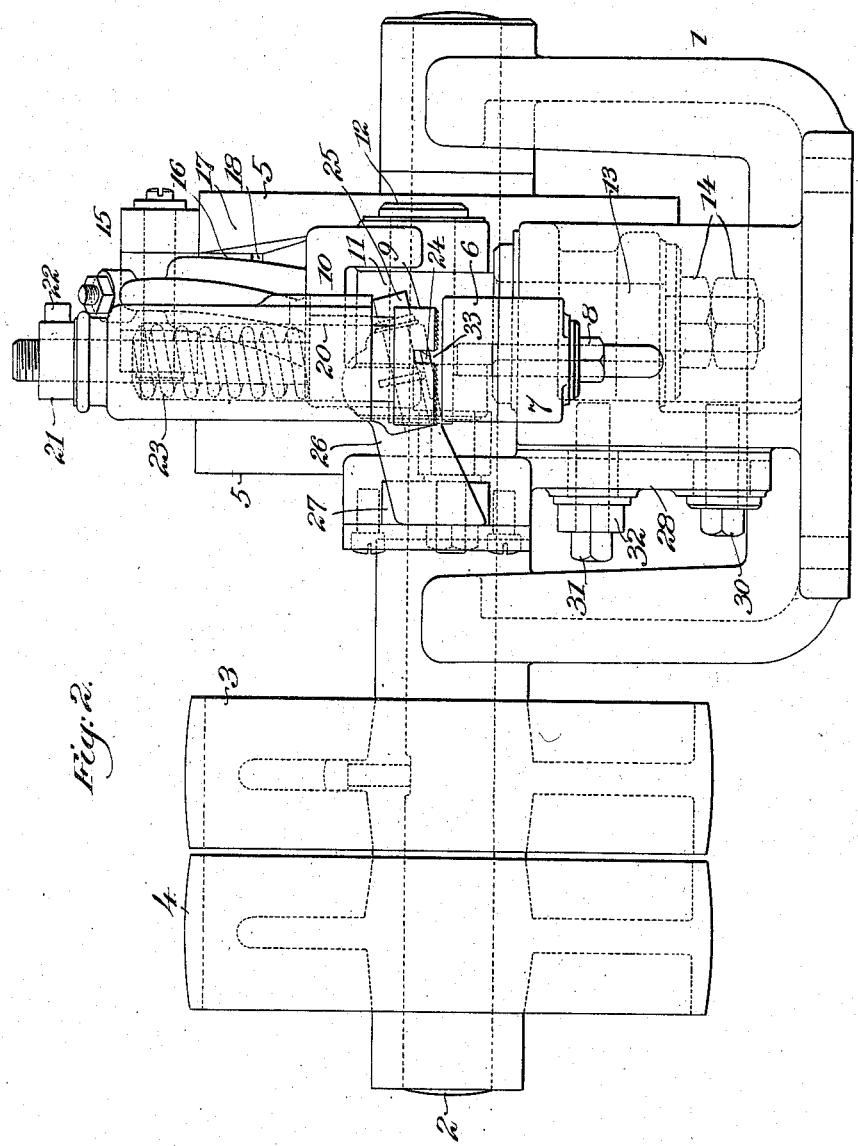

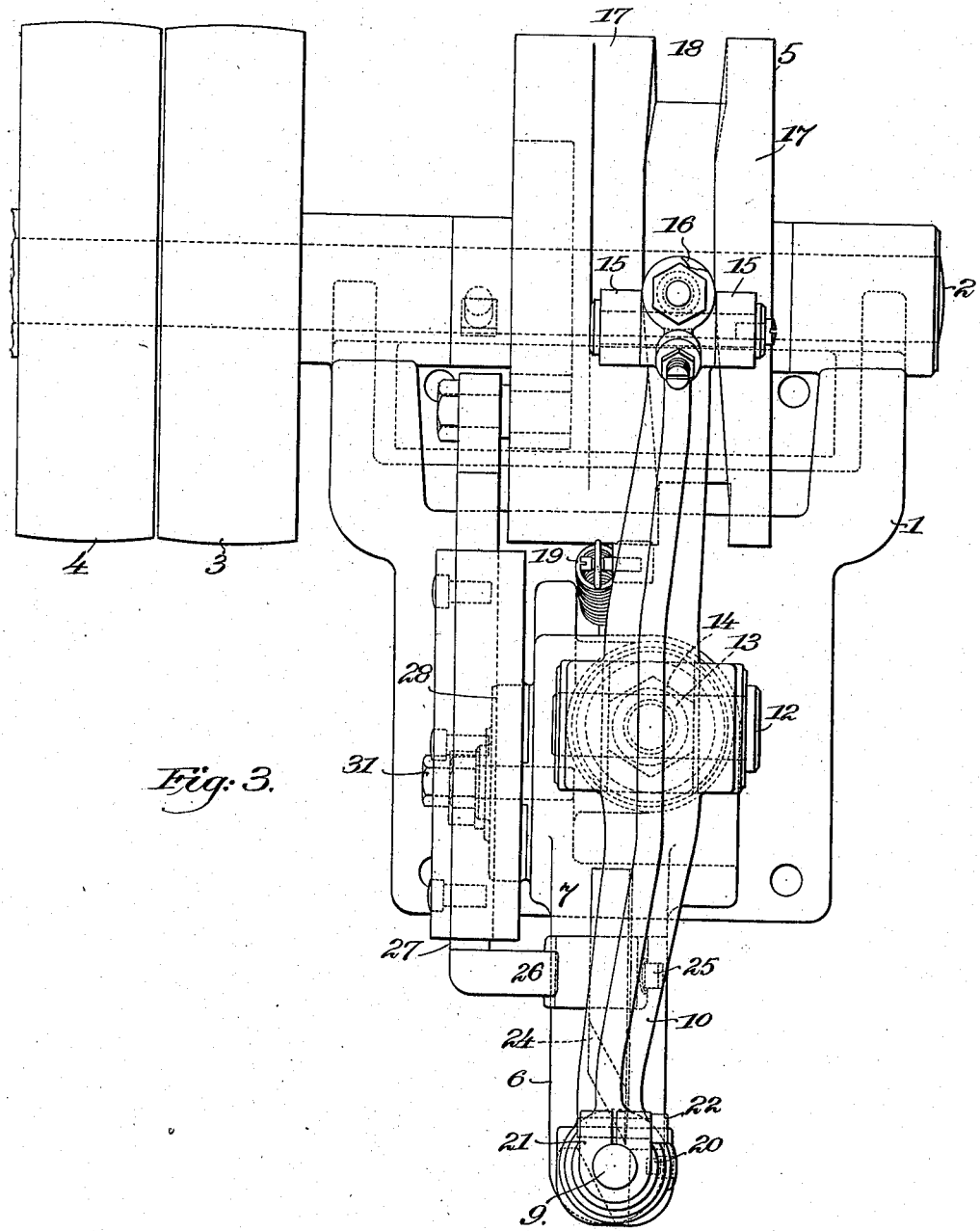

No. 885,244. PATENTED APR. 21, 1908.
J. B. HADAWAY.
MACHINE FOR OPERATING UPON WELTS OF BOOTS AND SHOES.
APPLICATION FILED MAY 26, 1902.
5 SHEETS—SHEET 4.
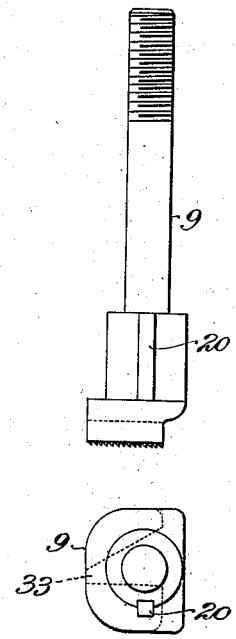
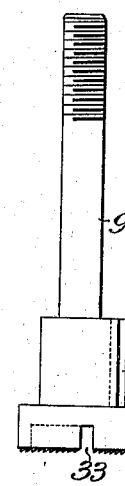
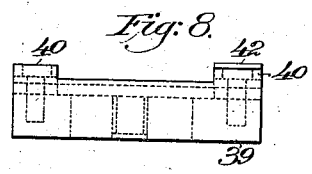
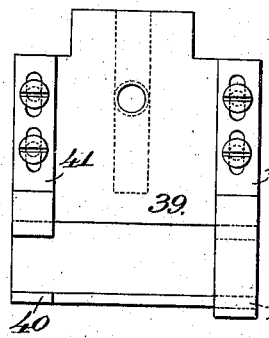
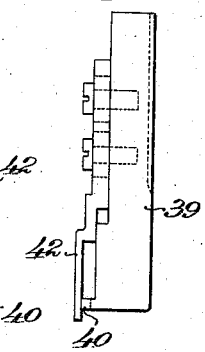
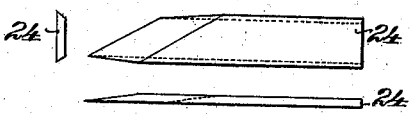
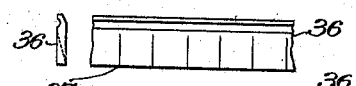
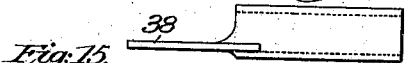
Witnesses:
John F. C. Premkert
Alfred H. Hildreth
Inventor:
John B. Hadaway
by his attorneys
Phillips Van Everen & Fish No. 885,244. PATENTED APR. 21, 1908.
J. B. HADAWAY.
MACHINE FOR OPERATING UPON WELTS OF BOOTS AND SHOES.
APPLICATION FILED MAY 26, 1902.

5 SHEETS—SHEET 5.

Witnesses:
John F. C. Brinkerh
Alfred H. Hildreth

Inventor:
John B. Hadaway
by his attorneys
Phillips Van Everen & Fish

UNITED STATES PATENT OFFICE.

JOHN B. HADAWAY, OF BROCKTON, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING UPON WELTS OF BOOTS AND SHOES.

No. 885,244.   Specification of Letters Patent.   Patented April 21, 1908.

Application filed May 26, 1902. Serial No. 109,018.

*To all whom it may concern:*

Be it known that I, JOHN B. HADAWAY, a citizen of the United States, residing at Brockton, in the county of Plymouth and State of Massachusetts, have invented certain new and useful Improvements in Machines for Operating upon Welts of Boots and Shoes; and I do hereby declare the following to be a full, clear, and exact description of the invention, such as will enable others skilled in the art to which it appertains to make and use the same.

The present invention relates to machines for operating upon welts of boots and shoes. The object of the present invention is to provide an efficient machine of simple construction by which a series of slits can be formed in a welt in a certain and satisfactory manner, to prepare the welt so that it can be easily and quickly beaten out flat.

With this object in view, the invention consists in the devices, combinations, and arrangements of parts hereinafter described and claimed, the advantages of which will be obvious to those skilled in the art from the following description.

The invention is intended primarily as an improvement in welt beating machines which are used in the manufacture of welted shoes to beat out the welt after attachment to the shoe to cause it to lie flat in substantially the plane of the insole. Certain features of the invention, however, are equally applicable to machines which do not act to beat out the welt.

Certain features of the invention are also applicable to machines for operating on a welt or welt strip before being attached to a shoe.

The various features of the invention will be clearly understood from an inspection of the accompanying drawings, in which is illustrated a machine for slitting and beating out welts embodying the invention in its preferred form.

Figure 24:
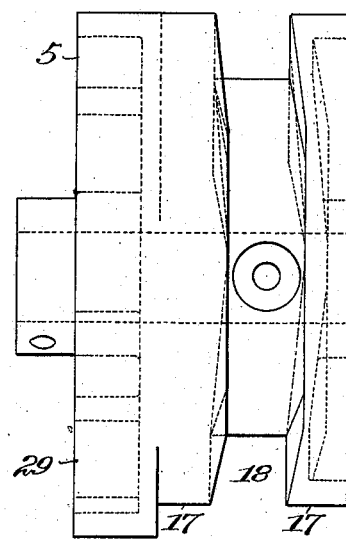
Figure 25:
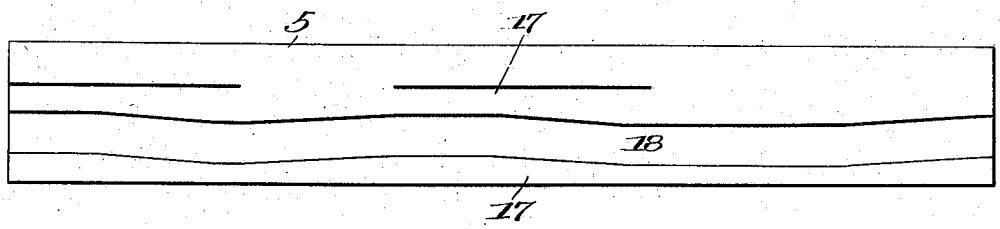

Referring to the drawings, Figure 1 is a view in side elevation of the machine; Fig. 2 is a view in front elevation and Fig. 3 is a plan view thereof; Figs. 4 and 5 are views in side and front elevation of the welt beating hammer; and Figs. 6 and 7 are top and bottom plan views thereof; Figs. 8, 9, and 10 are views in front elevation, plan, and side elevation of a work support adapted to support and guide a welt before being applied to a boot or shoe; Figs. 11, 12, and 13 are views in end elevation, plan, and side elevation of one form of welt slitting knife, the knife illustrated being that illustrated in Figs. 1, 2, and 3 and being adapted to form slits in the welt obliquely disposed to the surface of the welt; Figs. 14, 15, and 16 are views in plan, end elevation and side elevation of a modified form of knife; Figs. 17, 18, and 19 are views in end elevation, plan, and side elevation of a welt before being applied to a boot or shoe provided with slits disposed at right angles to the surface of the welt; and Figs. 20, 21 and 22 are similar views of a welt provided with slits disposed obliquely to the surface of the welt; Figs. 23 and 24 are face and edge views of the cam disk, and Fig. 25 is a development of the cam disk.

1 indicates the frame of the machine which may be secured to any suitable supports.

2 indicates the cam shaft journaled in bearings in the rear portion of the machine frame, provided at one end with fast and loose pulleys 3 and 4 and having secured thereto between its bearings a cam disk 5.

At the front of the machine frame is a work support 6 which is mounted upon a forwardly projecting arm 7 of the frame so as to be adjustable horizontally by means of a bolt 8 passing through a slot in the arm 7 and screwing into the work support. The forward end of the work support is shaped to enter the crease between the upper and the welt of a welted shoe and to support the welt on its upper surface, the forward end of the work support by contact with the bottom of the crease between the upper and the welt serving as a guide for the shoe being operated upon.

9 indicates the welt beating plunger which is mounted in the forward end of a lever 10. The lever 10 is provided intermediate its ends with two downwardly projecting lugs between which a block 11 is received and to which the lever is pivoted by means of a pivot pin 12 passing through the downwardly projecting lugs of the lever and through the block. The block 11 is secured to or formed integral with a vertical stud 13 mounted to rotate in suitable bearings in the frame of the machine and held from vertical movement by means of locking nuts 14 upon the lower screw-threaded end of the stud.

The stud 13 forms a vertical pivot about which the lever 10 is swung horizontally and the pivot pin 12 forms a horizontal pivot about which the lever 10 is swung vertically. To the rear end of the lever 10 are secured cam rolls 15 and 16 mounted upon horizontal and vertical studs respectively. The cam rolls 15 rest against the cam surfaces 17 formed on the disk 5 and the roll 16 engages a cam groove 18 formed in the peripheral surface of the disk. The rolls 15 are maintained in contact with the cam surfaces 17 by means of a coiled spring 19, one end of which is connected to the rear end of lever 10 and the other end to the frame of the machine. By means of the cam surfaces 17 and the cam groove 18 vertical and horizontal oscillating movements are imparted to the lever 10 to actuate the plunger 9 to beat out and feed the welt as will be hereinafter described. The cylindrical shank of the plunger 9 is mounted to slide in bearings in the forward end of the lever 10 and is held from rotation by means of a key 20 on the enlarged lower end of the shank of the plunger and a coöperating groove in the lever. The shank of the plunger extends above the end of the lever 10 and at its upper end is provided with a split nut 21 having a screw-threaded engagement therewith and being clamped thereto by means of a clamping bolt 22. A coiled spring 23 surrounds the shank of the plunger and is interposed between the upper end of the recess formed in the end of the lever 10 to receive the spring and the shoulder formed by the enlarged lower portion of the shank so that the plunger is yieldingly supported on the lever. The downward movement of the plunger under the influence of the spring 23 is limited by the nut 21, the position of which on the shank of the plunger can be adjusted as desired.

The welt slitting knife is indicated at 24. The knife is provided with a flat shank which is secured by means of a clamping bolt 25 in a socket in an arm 26 projecting laterally from a slide 27 mounted to reciprocate in horizontal guideways on a plate 28 secured to the frame of the machine. The rear end of the slide 27 is provided with a roll or stud which engages a cam groove 29 in one face of the cam disk 5. The arrangement of the knife 24 and slide 27 is such that the knife reciprocates transversely to the line of feed in substantially the plane of the welt and the cutting blade of the knife is so arranged with relation to the upper surface of the work support 6 upon which the welt is supported that the slits formed in the welt by the knife extend partially through the welt from one surface toward the other and are obliquely disposed to the surface of the welt. In order to vary the depth of the slits the knife 24 is adjusted vertically and as a means for effecting such adjustment the plate 28 in which the slide 27 is mounted is provided with a guide groove which is engaged by a guiding projection on the frame of the machine as is clearly shown in Fig. 3 and is also provided with slots, the lower of which is arranged vertically and the upper of which is arranged horizontally. Through the lower of these slots a bolt 30 passes and screws into the frame of the machine. Through the upper slot a similar bolt 31 passes and screws into the frame of the machine, and upon this bolt is rotatably mounted an eccentric 32, which engages the upper and lower edges of the slot. The plate 28 is clamped to the frame by means of the bolts 30 and 31 and by loosening the bolts and rotating the eccentric 32 the plate can be raised or lowered to adjust the knife to cut slits of any desired depth.

The operation of the machine above described is as follows:—Starting with the part in the position indicated in Figs. 1, 2, and 3 in which position the plunger 9 is down and at the limit of its movement to the right as viewed in Figs. 2 and 3, as the disk 5 rotates in the direction indicated by the arrow the lever 10 is actuated by the cam groove 18 to move the plunger 9 to the left, feeding the welt over the support 6. At the end of the feeding movement and while the welt is held clamped between the plunger and work support the knife 24 is advanced by the action of the cam groove 29 and caused to cut a slit in the welt. The knife is arranged in line with the plunger and in order to allow the knife to slit the welt the plunger is provided with a recess 33 in its working face to receive the knife. During the cutting stroke of the knife the welt is held clamped between the plunger and work support and is thus supported against the thrust of the knife. In order to enable the plunger to engage the welt and feed it with certainty, its lower face is corrugated as indicated in Figs. 4, 5, and 7. After the slit has been formed in the welt the lever 10 is actuated by the spring 19 to raise the plunger from the welt and is actuated by the cam groove 18 to return the plunger to its extreme position at the right, these movements taking place simultaneously so that the plunger moves diagonally upward. At the same time the cam groove 29 acts to withdraw the knife from the welt. By causing these movements to take place simultaneously instead of successively, the time required for these movements is decreased and the speed of the machine is correspondingly increased. The lever 10 is then actuated by the cam surface 17 to bring the plunger 9 in contact with the welt and is actuated by the cam groove 18 to cause the plunger to again feed the work and to raise the plunger and return it to its extreme position at the right. The lever 10 is then again actuated by the cam surface 17 to bring the plunger in contact with the welt, thus completing a cycle of operations of the machine.

It will be noted that two welt beating and feeding movements are imparted to the plunger for each slitting movement of the knife, the knife being actuated to slit the welt at the end of every alternate feed movement. I consider it preferable to so actuate the plunger and knife as thereby a short feeding movement can be imparted to the welt and the working face of the plunger which is wider in the direction of feed than the length of each feed movement is caused to act upon each portion of the welt a plurality of times. Also the shoe is more easily guided than when a long feed movement is imparted to the plunger and no difficulty is experienced in keeping the shoe in proper position while the plunger is acting upon the welt at the toe portion of the shoe. It will be obvious, however, that by providing suitably shaped cams a single feeding movement may be imparted to the plunger for each movement of the welt slitting knife, or that if desired three or more feed movements may be imparted to the plunger for each movement of the welt slitting knife.

The slits formed in the welt by the slitting knife extend through that portion of the welt which would otherwise resist the strain to which the welt is subjected during the beating out operation. The grain side of the welt which is not cut is easily stretched so that the beating out operation is performed in a satisfactory manner by subjecting the welt but once to the operation of the machine.

The advantages secured by forming slits in the welt which are diagonally disposed to the surface of the welt will be obvious from an inspection of Figs. 20, 21 and 22. In these figures 34 indicates a welt strip before being applied to a boot or shoe provided with slits 35 diagonally disposed with relation to the surface of the welt. From these figures it will be evident that when the outer edge of the welt is stretched the portions of the welt above and below the slits will slide over each other and can be compressed during the welt beating operation so that no open slots will be left in the welt. The form of the slit 35 illustrated in Figs. 20, 21 and 22 is that produced by the slitting knife illustrated in Figs. 11, 12 and 13. It will be seen that the bottom of this slit extends in a straight line from the grain surface of the welt at the outer edge to the flesh surface of the welt at a point near the stitch receiving groove. It will be evident, however, that by changing the shape of the cutting edge of the knife the bottom of the slit for the greater portion of its length might be made to extend more nearly parallel with the grain surface of the welt.

While I consider it preferable for the reasons hereinbefore stated to use a knife which is adapted to form slits in the welt obliquely disposed to the surface of the welt, it will be obvious that a knife adapted to form slits in the welt disposed at right angles to the surface of the welt might be employed. The form of slits formed in the welt in such case is indicated in Figs. 17, 18, and 19, in which figures 36 indicates a welt strip before being applied to a boot or shoe provided with slits 37 disposed at right angles to the surface of the welt. In the particular form of slit indicated in these figures, the bottom of the slit extends in a straight line from the grain surface of the welt at the outer edge to the flesh surface of the welt at a point near the groove in the welt.

In Figs. 14, 15, and 16, I have indicated a modified form of knife, the cutting blade 38 of which instead of being arranged in the same plane with the flat shank as in the knife illustrated in Figs. 11, 12, and 13 is arranged at right angles to the shank. It will be evident that the blade of the knife can be arranged at any desired angle with relation to its shank, so that the slits produced in the welt may be disposed at right angles to the surface of the welt or at any desired angle of inclination.

As I have stated, certain features of my invention are applicable to a machine for operating upon a welt before it is applied to a boot or shoe, and in Figs. 8, 9, and 10 I have illustrated a form of work support which may be substituted for the work support 6 and which is adapted to support and guide a welt strip. Referring to these figures, 39 indicates the support which may be clamped on the arm 7 of the machine illustrated in Figs. 1, 2, and 3 by means of the clamping bolt 8 in place of the support 6. The front edge of the support 39 is provided with upturned guiding lugs 40 which with guides 41 and 42 adjustably secured to the support 39 constitutes a guideway for the welt strip. When this support is substituted in the machine illustrated in Figs. 1, 2, and 3 for the support 6, the machine acts to feed and slit the welt strip, the operation being the same as has been described. Forms of welt strips which are produced by the machine are illustrated in Figs. 17 to 22. Such welt strips can be applied to a boot or shoe in the same manner as an ordinary welt. When the machine is used to operate upon welts before being applied to a boot or shoe, I prefer for the reasons hereinbefore stated to use a welt slitting knife which will form slits in the welt obliquely disposed to the surface of the welt, and for the further reason that when the slits are so formed the welt can be fed through the welt guide of a welt sewing machine without any liability of the edges of the slits catching on the guide.

Having thus indicated the nature and scope of my invention and having described a machine embodying a preferred form thereof, I claim as new and desire to secure by Letters Patent.

1. A machine for operating upon welts, having, in combination, a welt beating hammer, means for actuating the same to beat out and feed the welt, a work support shaped to support the welt of a welted shoe, a welt slitting knife arranged to reciprocate transversely across the welt in substantially the plane of the welt provided with a cutting edge shaped to cut a slit extending partially therethrough and obliquely disposed to the surface of the welt, and means for actuating the knife to slit the welt while the welt is clamped between the hammer and work support, substantially as described.

2. A machine for operating upon welts, having, in combination, a welt slitting knife arranged to reciprocate transversely across the welt in substantially the plane of the welt and cut a slit in the welt extending partially through the thickness of the same, means for actuating the knife, means for feeding the welt, and means for supporting the welt against the thrust of the knife, substantially as described.

3. A machine for operating upon welts, having, in combination, a welt beating hammer, a work support shaped to support the welt after attachment to the shoe, a welt slitting knife arranged to cut a slit in the welt extending partially through the thickness of the same, and mechanism acting to actuate the hammer and knife and to feed the welt, substantially as described.

4. A machine for operating upon welts, having, in combination, a work support shaped to support the welt after attachment to the shoe, a welt slitting knife arranged to reciprocate transversely across the welt provided with a cutting edge shaped to cut a slit in the welt extending partially therethrough and obliquely disposed to the surface of the welt, means for actuating the knife, and means for feeding the shoe to space the slits made by the knife, substantially as described.

5. A machine for operating upon welts, having, in combination, means for supporting and feeding the welt, and means for forming in the welt a series of slits extending partially across the welt and partially through the thickness of the same and obliquely disposed to the surface of the welt, substantially as described.

6. A machine for operating upon welts, having, in combination, a welt slitting knife arranged to reciprocate transversely across the welt, a welt beating hammer provided with a recess to receive the knife, a work support shaped to support the welt after attachment to the shoe, means for actuating the hammer to beat out and feed the welt, and means for actuating the knife, substantially as described.

7. A machine for operating upon welts, having, in combination, a welt beating hammer, means for actuating the same to beat out and feed the welt, a work support shaped to support the welt of a welted shoe, a welt slitting knife, and means for actuating the knife to slit the welt while the welt is clamped between the hammer and work support, substantially as described.

8. A machine for operating upon welts, having, in combination, a welt beating hammer acting to beat out and feed the welt, a work support shaped to support the welt of a welted shoe, a welt slitting knife, and mechanism for actuating the hammer and knife arranged to impart to the hammer a plurality of welt beating and feeding movements for each welt slitting movement of the knife, substantially as described.

9. A machine for operating upon welts, having, in combination, a work support shaped to support the welt of a welted shoe, means for feeding the welt, and separate means for forming in the welt a series of slits extending partially through the thickness of the same, substantially as described.

10. A machine for operating upon welts, having, in combination, means for intermittently clamping and feeding the welt, and means for forming in the welt while clamped a slit extending partially through the thickness of the same, substantially as described.

11. A machine for operating upon welts, having, in combination, means for beating out and feeding the welt, and means for forming in the welt a series of slits extending partially through the thickness of the same, substantially as described.

12. A machine for operating upon welts, having, in combination, a welt beating hammer, a work support shaped to support the welt after attachment to the shoe, a welt slitting knife, means for actuating the hammer to beat out and feed the welt, and means for actuating the knife, substantially as described.

13. A machine for operating upon welts, having, in combination, a welt beating hammer, means for actuating the same to beat out and feed the welt, a work support shaped to support the welt after attachment to the shoe, a welt slitting knife, and means for actuating the knife to slit the welt while the welt is clamped between the hammer and work support, substantially as described.

14. A machine for operating upon welts after attachment to the shoe, having, in combination, a work support for supporting the projecting edge of the welt, welt slitting means, and means for beating out the welt and for feeding the shoe to present successive portions of the projecting edge of the welt to the welt beating and slitting means, substantially as described.

15. A machine for operating upon welts, having, in combination, a welt slitting knife arranged to reciprocate transversely to the line of feed across the welt, means for actuating the knife to slit the welt, and means for feeding and clamping the welt comprising cam-actuated clamping means for supporting the welt against the thrust of the knife, substantially as described.

16. A machine for operating upon welts, having in combination, means for feeding the welt, and separate means for forming in the welt a series of slits extending partially across the welt and partially through the thickness of the same, substantially as described.

17. A machine for operating upon welts, having, in combination, means for clamping and feeding the welt, and means for forming in the welt while clamped a slit extending partially across the welt and partially through the thickness of the same, substantially as described.

18. A machine for operating upon welts, having, in combination, a welt slitting knife arranged to reciprocate across the welt in substantially the plane of the welt and cut a slit obliquely disposed to the surface of the welt, means for actuating the knife, and means for feeding the welt to space the slits made by the knife, substantially as described.

19. A machine for operating upon welts, having, in combination, means for supporting and feeding a welt, and means for forming in the welt a series of slits extending partially across the welt and partially through the thickness of the welt, substantially as described.

In testimony whereof I affix my signature, in presence of two witnesses.

JOHN B. HADAWAY.

Witnesses:
FRED O. FISH,
ALFRED H. HILDRETH.